Figure 1:
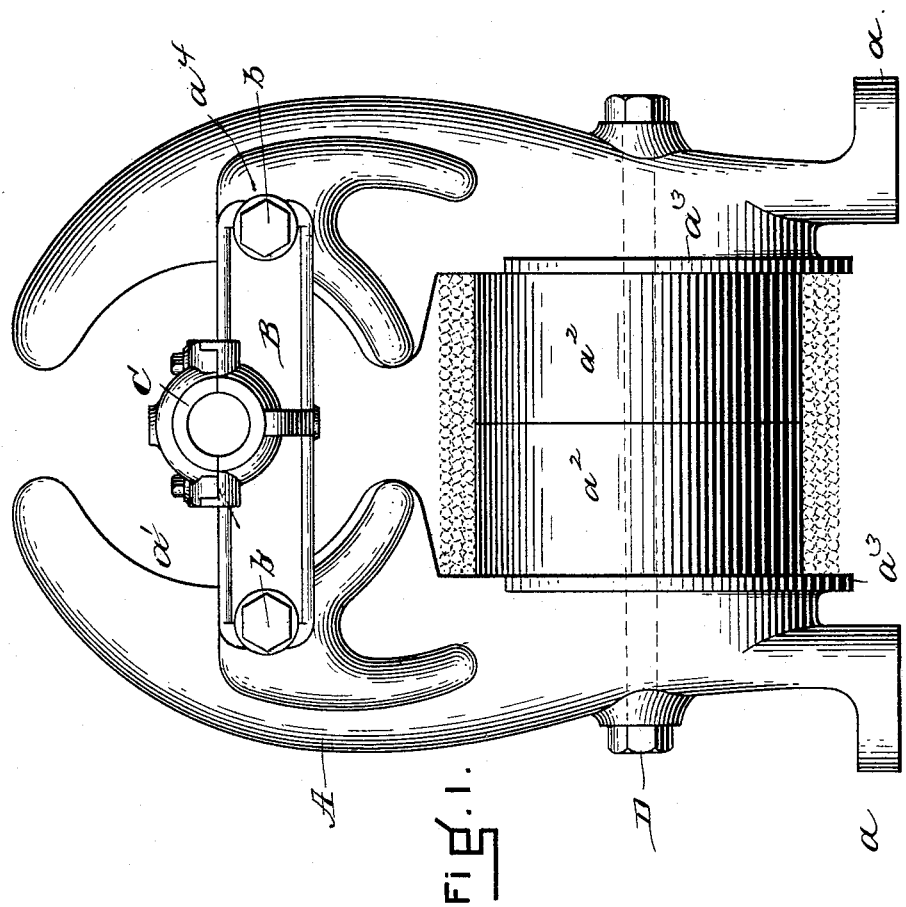

(No Model.) 2 Sheets—Sheet 1.

W. K. FREEMAN.
ELECTRIC MOTOR OR GENERATOR.

No. 452,935. Patented May 26, 1891.

WITNESSES.
Thomas Durant.
E. D. Smith

INVENTOR.
Walter K. Freeman,
By Clench & Clench
his Attys.

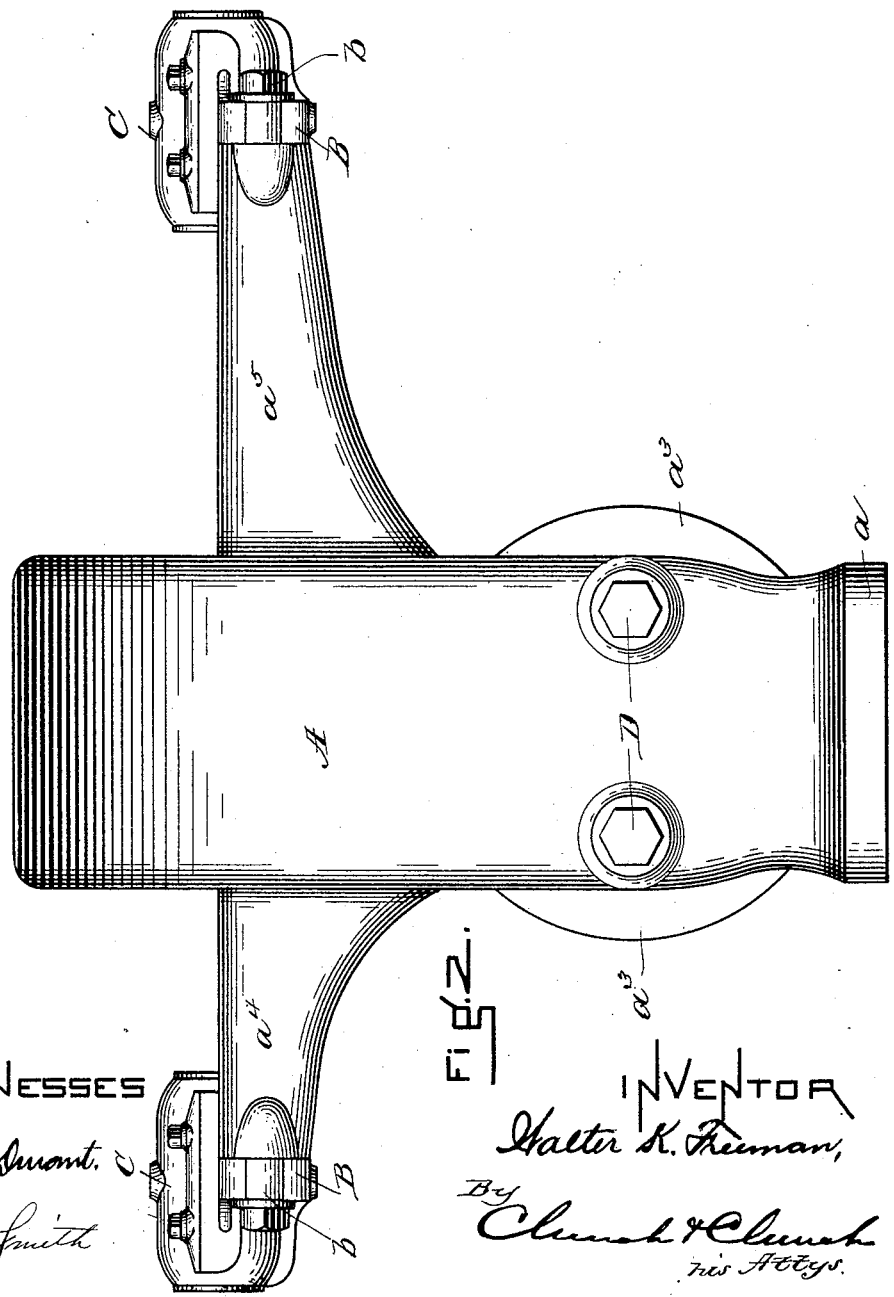

UNITED STATES PATENT OFFICE.

WALTER K. FREEMAN, OF BROOKLYN, NEW YORK, ASSIGNOR TO WILLIAM S. HADAWAY, JR., TRUSTEE, OF BOSTON, MASSACHUSETTS.

ELECTRIC MOTOR OR GENERATOR.

SPECIFICATION forming part of Letters Patent No. 452,935, dated May 26, 1891.

Application filed January 13, 1891. Serial No. 377,665. (No model.)

*To all whom it may concern:*

Be it known that I, WALTER K. FREEMAN, of Brooklyn, in the county of Kings and State of New York, have invented certain new and useful Improvements in Electric Motors; and I do hereby declare the following to be a full, clear, and exact description of the same, reference being had to the accompanying drawings, forming part of this specification, and to the letters of reference marked thereon.

In the building of electric motors electrical efficiency has to be sacrificed to some extent to mechanical construction in order that the machine may be produced at a cost that will insure its salability, and the problem always is to secure that plan of mechanical construction which, while cheap and simple, will give the necessary efficiency. By my present invention I have, I believe, succeeded in producing a motor which approaches the ideal commercial machine, the result being accomplished by novel construction of parts, as hereinafter fully described.

Referring to the accompanying drawings, Figure 1 represents an end view of my invention, and Fig. 2 a side elevation of the same.

Similar letters of reference in both figures indicate the same parts.

A A represent two light castings, each of which is provided with suitable flanges or feet $a$, upon which to support it, with a concave portion $a'$ conforming generally to the contour of the armature, so as to partially inclose the latter, with a core-piece $a^2$ to receive and support the field-coils, (indicated by the dotted lines, Fig. 1,) and flanges $a^3$ to hold said coils in place longitudinally upon said cores, and with projecting arms $a^4$ $a^5$ for sustaining the brackets B B, which carry the bearings C C of the armature-shaft. In putting this frame-work together the castings A A are brought into juxtaposition with the field-coils upon their core-pieces $a^2$, as indicated in Fig. 1, after which they are secured in this position by means of strong bolts D passed through them, as indicated by the dotted lines in Fig. 1. The brackets B are of non-magnetic material, such as brass, and they are secured in place upon the castings A by means of bolts $b$, as shown in the figures. It will be seen that this construction of frame-work is very cheap and simple, since it involves the use of but four principal parts beside the securing-bolts, and enables a very compact and efficient motor to be produced at a minimum cost. It will be noted that by dividing the core of the field-coils centrally not only are the coils enabled to be applied more readily, but the division of the core is secured at practically the neutral point of the magnetic field, and consequently at the most desirable point having in view the object to be attained.

I claim as my invention—

1. In the herein-described frame for electric motors, the combination of the two sections A A, each formed in one piece and having the concave portion $a'$, arms $a^4$ $a^5$, extending on opposite sides of the same, respectively, and the half core-piece $a^2$ at the bottom, substantially as described.

2. In the herein-described frame for electric motors, the combination of the two sections A A, each formed in one piece and having the concave portion $a'$, arms $a^4$ $a^5$, extending on opposite sides of the same, respectively, the half core-piece $a^2$ at the bottom, and the flange $a^3$ on each side at the base of the core-piece, substantially as described.

3. In the herein-described motor-frame, the combination, with the two sections A A, each formed in one piece, with the concave portions $a'$ and arms $a^4$ $a^5$ projecting on opposite sides, respectively, at the top, of the half core-pieces formed on the said pieces A at the bottom and adapted to abut against each other, the securing-bolts D, passing through said core-pieces $a^2$ and the base of the pieces A, and the brackets B, carrying the armature-shaft bearings and bolted to the ends of the arms $a^4$ $a^5$, substantially as and for the purpose set forth.

WALTER K. FREEMAN.

Witnesses:
W. S. HADAWAY, Jr.,
CHAS. W. WOLCOTT.